March 8, 1938. H. E. G. T. GERLICH 2,110,264
BULLET
Filed Oct. 29, 1935 4 Sheets-Sheet 1
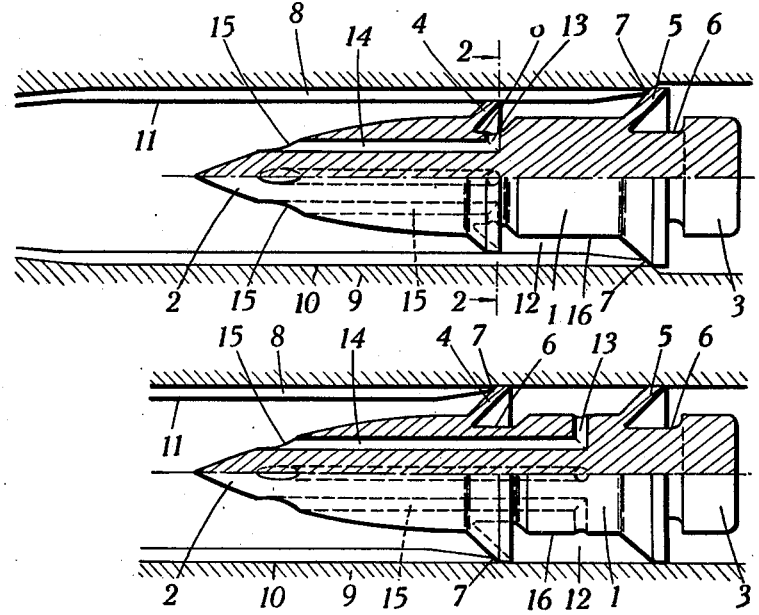
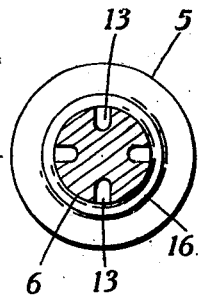
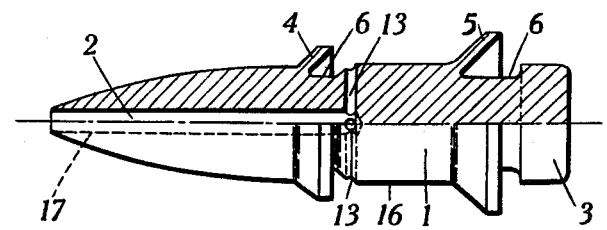
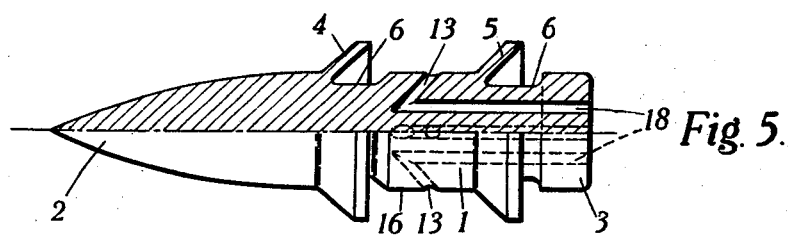
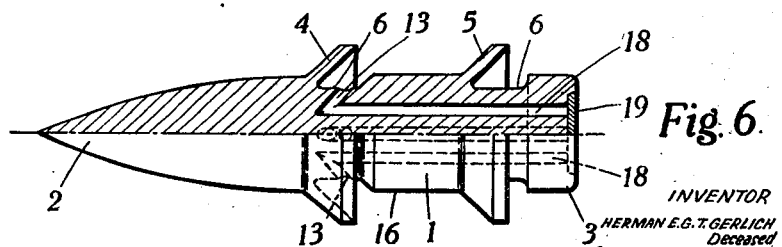
INVENTOR
HERMAN E.G.T. GERLICH
Deceased
By
FRANKA GERLICH Administratrix
BY
Richard E. Babcock
ATTORNEY March 8, 1938.   H. E. G. T. GERLICH   2,110,264
BULLET
Filed Oct. 29, 1935   4 Sheets-Sheet 2
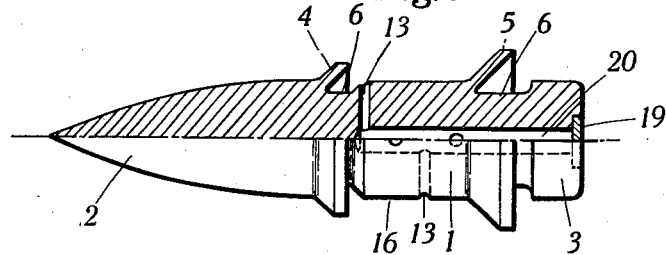
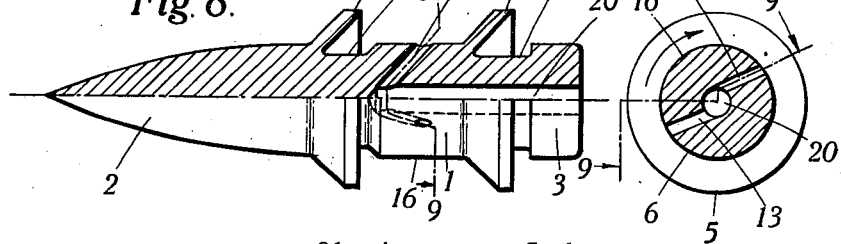
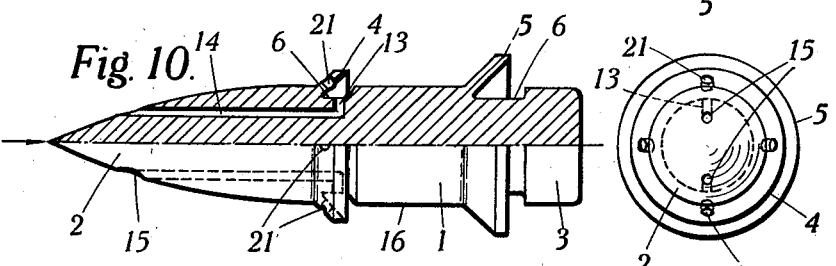
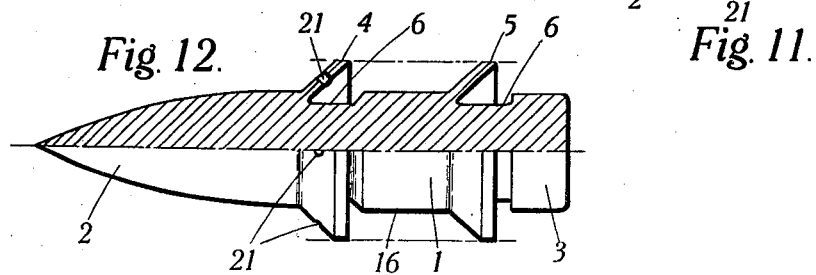
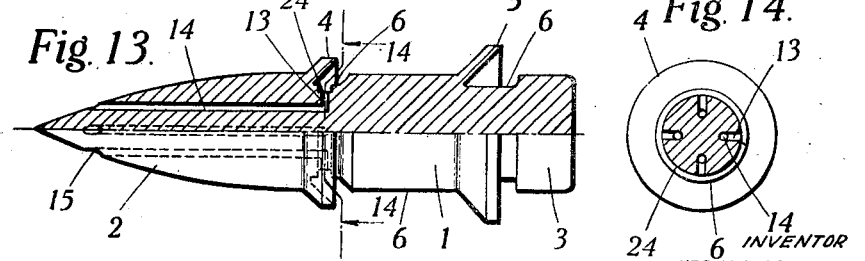
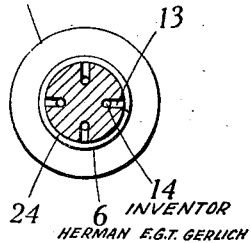
INVENTOR
HERMAN E.G.T. GERLICH
Deceased
BY FRANKA GERLICH Administratrix
Richard E. Babcock
ATTORNEY March 8, 1938.  H. E. G. T. GERLICH  2,110,264
BULLET
Filed Oct. 29, 1935  4 Sheets-Sheet 3

INVENTOR
HERMAN E.G.T. GERLICH
Deceased
By FRANKA GERLICH Administratrix
BY Richard E. Babcock
ATTORNEY March 8, 1938. H. E. G. T. GERLICH 2,110,264
BULLET
Filed Oct. 29, 1935 4 Sheets-Sheet 4

INVENTOR
HERMAN E.G.T. GERLICH
Deceased
By
FRANKA GERLICH Administratrix
BY
Richard E. Babcock
ATTORNEY Patented Mar. 8, 1938

2,110,264

UNITED STATES PATENT OFFICE 2,110,264

BULLET

Hermann E. G. T. Gerlich, deceased, late of Østrupgaard, per Otterup, Fyn, Denmark, by Franka Gerlich, administratrix, Østrupgaard, per Otterup, Fyn, Denmark Application October 29, 1935, Serial No. 47,331
In Yugoslavia November 3, 1934

16 Claims. (Cl. 102—26)

This invention relates to projectiles to be fired from projectile propelling apparatus generally, particularly rifles, cannons, aircraft guns and so forth, such as are used in military work. The invention is also applicable to sporting arms.

The invention is especially applicable for use with projectile propelling apparatus of the known form in which the cross sectional area of the barrel is greater adjacent the breech chamber than it is at the muzzle of the barrel, and in which the cross sectional area decreases to the smaller area in a gradual taper or curve.

A barrel for projectile propelling apparatus having these characteristics was described in prior Patent No. 1,944,883 which also described how the bore could be very considerably enlarged at the breech chamber end in comparison with the bore at the muzzle end of the barrel, and enlargements of from say 20 to 200 percent or more of the cross sectional area were contemplated.

Prior Patent No. 1,944,883 also explained how the enlarged breech chamber end of the barrel might be maintained cylindrical or substantially cylindrical throughout that length of the barrel over which the maximum gas pressures operate and explained how afterwards the bore may decrease gradually to the muzzle calibre, and how the bore might be cylindrical for a short section before the muzzle.

Said prior patent also explained that the features above named could be employed in a rifled or partially rifled or a smooth bore barrel, and explained that the lands bore in a rifled barrel should, as well as the groove bore, be enlarged in a direction towards the breech chamber end in one or more tapers, and also explained that the lands bore could have a cylindrically enlarged section at the breech chamber end and a cylindrical portion at the muzzle end if desired. In a partially rifled barrel the rifling, which extended rearwardly from the muzzle, could terminate at any suitable position in the barrel so as to leave the enlarged cylindrical portion of the bore in front of the breech chamber smooth.

In prior Patent No. 1,944,885 was described a projectile suitable for use with the barrel described in Patent No. 1,944,883 and having two or more spaced annular ductile depressible flanges which stood out from the projectile body at the commencement of the projectile's motion, but were gradually depressed into cannelures, provided one behind each flange to receive the latter when depressed, as the projectile passed through the barrel. The projectile body was to be of substantially the same calibre as (or of slightly less calibre than) the minimum muzzle calibre of the barrel for which the projectile was designed. The flanges were to take the gas pressure and seal the bore in the enlarged parts of and throughout the latter, and they were also intended to take all the lateral strains set up by the flanks of the lands which, when provided, cut into the flanges to cause the projectile to rotate but do not cut into the body of the projectile.

When a projectile of the kind last referred to is propelled from a barrel enlarged in a direction towards the breech chamber as previously described, and especially where the enlargement is rather great, say, for example, in the order of fifty to two hundred or more percent, then, just at the commencement of the projectile's movement in the barrel, as the flanges of the projectile are not a very good fit in the latter, some gases of explosion leak into the space defined at the front and rear by the flanges of the projectile and defined exteriorly by the walls of the bore of the barrel and interiorly by the body of the projectile. These gases join the air already in said space. Almost immediately the pressure behind the flanges causes these to seal the barrel perfectly and so air and other gases are trapped in the space between the flanges. As the projectile moves through the tapered part of the bore of the barrel the flanges are depressed by the tapering walls of the barrel bore so that the said space between the flanges gradually decreases until just prior to the projectile leaving the barrel. This space is exceedingly small. Hence the pressure of the gases collected in the space between the flanges of the projectile gets ever higher and higher, and it has been found in practice that when it is desired to obtain projectile velocities over about 900 to 1000 metres/second these trapped gases have the effect of blowing off the front, and sometimes the rear, flange of the projectile whilst the latter is in the barrel or at the moment the projectile leaves the barrel. Sometimes these trapped gases merely blow the flanges up again either partially or wholly just as the projectile leaves the barrel. The trapped gases also otherwise detrimentally affect the projectile and its performance, and it is one of the objects of this invention to eliminate this interference with the projectile and with its performance.

Another object of the invention is generally to improve bullets of the flanged kind, whilst a further object of the invention is further to improve the highly successful results obtained with barrels and projectiles according to prior Patents Nos. 1,944,883 and 1,944,885 respectively.

Thus with these objects in view this invention provides a projectile having axially spaced peripheral flanges adapted to be depressed into cannelures provided for their reception in the body of the projectile, such projectile being characterized by the provision of means, additional to said cannelures, for the reduction of the pressure of gases collecting in the space between the flanges of the projectile and which space decreases during the passage of the projectile to the muzzle of the barrel.

By the term "reduction of the pressure of gases in the space between the flanges" it is not necessarily meant that the gas pressure is reduced below the initial pressure but that the ultimate pressure of gases between the flanges late in the progress of the projectile through the barrel will when this invention is embodied in a projectile be less than in the case where the present invention is not embodied in the projectile and when all other conditions are the same in both cases.

This provision for the reduction of said gas pressure may be effected by grooving or recessing the outer surface of the body of the projectile between the flanges and additional to said cannelures, or may be effected by the formation of passages through the front flange of the projectile or through the body of the latter so as to permit of the escape of gases from said space between the flanges, or any other suitable form of cavitying or hollowing the projectile externally or internally can be employed. Moreover any suitable combination of the above named methods of reducing the gas pressure may be employed.

It will be appreciated that by using a barrel having an enlarged cross sectional area at the breech chamber end a larger powder charge can be employed and so greater energy can be given to the projectile without materially affecting the normal gas pressure height within the barrel and whilst using a projectile which is finally (as it leaves the barrel) of more or less normal calibre and of more or less normal sectional density and whilst the barrel is of more or less normal weight. Thus very much higher performance efficiency can be obtained, such as for example very much increased velocities, greater accuracy and greater penetrating powers.

Alternatively normal velocities may be obtained with sub-normal gas pressures and sub-normal powder charges.

In order that the invention may be more fully understood and readily carried into practice, I append hereto four sheets of drawings illustrating the various features of my invention and certain practical embodiments thereof. It should be understood that the drawings are given by way of illustration only and not by way of limitation.

Figures 1, 3 to 8, 10, 12, 13, 15 to 17 and 19 to 22 are part longitudinal cross sectional elevations and part side elevations of various forms of projectile constructed in accordance with this invention.

Figures 1 and 3 show the projectile diagrammatically in a firearm barrel constructed in accordance with Patent No. 1,944,883 previously referred to.

Figure 2 is a cross sectional elevation on line 2—2, Fig. 1, looking in the direction of the arrows.

Figure 9 is a section on line 9—9, Fig. 8.

Figure 11 is an end elevation of the projectile shown in Fig. 10, looking in the direction of the arrow A.

Figure 14 is a cross section on line 14—14, Fig. 13, looking in the direction of the arrows.

Figure 15:
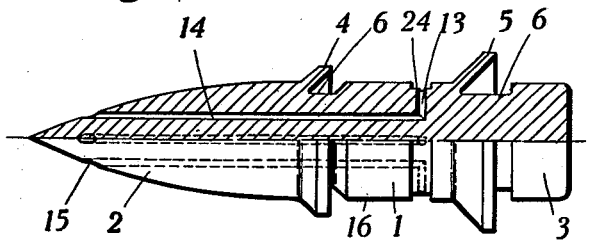

The projectile shown in Figures 1 and 2 comprises a body 1 having a pointed nose 2 and a cylindrical tail 3. The projectile is provided with two axially spaced outwardly and backwardly projecting annular flanges respectively marked 4 and 5 and behind each of these flanges is provided in the body of the projectile an annular cannelure or groove 6, each serving just wholly to receive the flange in front of it when the latter is depressed.

The projectile shown in Figure 1 is primarily intended for firing from a barrel constructed as described above and which is rifled and has at the breech chamber end a portion of enlarged diameter, both in regard to the groove bore and the lands bore, such enlarged portion being substantially cylindrical and extending along the barrel over that part thereof in which the gas pressures are at their highest values.

When the projectile is inserted in the barrel in a position for firing the rear flange 5 abuts the rear ends 7 of the rear ends of the lands 8 of the barrel 9 and the rear flange 5 is of such a diameter that it is a slightly forcing fit in the groove bore 10, whereas the front flange 4 is of smaller diameter and is either exactly the same diameter as the lands bore 11 or a very slight forcing fit therein.

It will be seen that the space 12 between the flanges 4 and 5 communicates, during the earlier parts of the flight of the projectile with the spaces in front of the projectile via the grooves between the lands 8, into which the front flange does not initially project. Hence, during the earlier parts at least of the travel of the projectile, the gases which have collected in the space or chamber 12 can escape through the spaces between the lands and over the edges of the front flange 4.

The gases collected in the chamber 12 at the beginning of the projectile's movement are air which is initially present between the flanges of the projectile and gases which leak past the rear flange of the projectile at the very beginning of the firing phenomenon.

Further to facilitate the escape of gases from the space 12 the projectile is, as shown in Figure 1, provided with a plurality of radial circumferentially spaced passages 13 (in addition to making the flange 4 less in diameter than flange 5), each communicating with a forwardly extending passage 14 which opens at its front end 15 in the nose 2 of the projectile. The passages 13 open into the cannelure 6 behind the front flange 4.

It will be seen that as the space or chamber 12 gradually decreases in volume and particularly in radial width as the projectile moves down the tapered part of the barrel 9 of the firearm gases at first escape from the chamber 12 both by way of passages 13 and 14 and over the edge of the front flange 4 and between the lands 8 of the barrel. Subsequently when the flange 4 has been cut into by the lands and the flange is bearing on the base of the grooves of the bore the escape of gas from chamber 12 takes place solely through the passages 13 and 14.

By this means, such trapped gases as may be left between the flanges 4 and 5 of the projectile just prior to the latter leaving the barrel are at such a pressure as not to be dangerous or detrimental to the performance of the projectile.

Referring to Figure 3 of the drawings, it will be seen that the projectile there illustrated is in most respects similar to that shown in Figures 1 and 2 and for similar parts similar references are employed. However, in this projectile the forward flange 4 is of the same diameter as the rear flange 5 and when the projectile is inserted into the barrel it is the forward flange that initially bears against the end 7 of the lands 8. Also in this projectile instead of the radial passages 13 opening into the front cannelures 6 they open into the space 12 between the flanges 4 and 5 in the part of the cylindrical intermediate body portion 16 of the projectile. Thus the passages 13 are open to the very last and the flow of gases to these passages is not in any way restricted by the down-folding of the front flange 4 of the projectile.

The projectile shown in Figure 4 differs from the one shown in Fig. 1 mainly in that the passages 13 communicate with a common central axial bore 21 with which the projectile is provided, and which is closed at its rear end and open at the nose 2 of the projectile.

Also the passages 13 open at the front end of the cylindrical portion 16 of the body instead of in the cannelure 6.

In Figure 5 is shown a projectile which is a modification of the projectile illustrated in Figure 3 and the projectile has a series of radial passages 13 obliquely disposed with respect to the axis of the projectile and each of which communicates at its inner end with a longitudinal passage 18 extending from the passage 13 to the rear of the projectile. The passages 13 open at the cylindrical part 16 of the projectile as shown. The flanges 4 and 5 of the projectile shown in Figure 5 are of equal diameter.

Figure 6 shows a projectile very similar to that shown in Fig. 5 but in this case the oblique passages 13 open into the front cannelure 6 of the projectile insead of in the cylindrical part 16 thereof. Moreover, the rear ends of the passages 18 are closed by a detachable valve plate 19 sunken into the tail 3 of the projectile and which valve is adapted to be blown open when the gas pressure between the flanges 4 and 5 exceeds the gas pressure behind the projectile.

Figure 7 shows a projectile somewhat similar to that shown in Figure 4 but in which the bore 17 is replaced by a rearwardly extending bore 20 which opens at the rear of the projectile instead of at the front. This figure also illustrates how the passages 13 may be arranged in different cross sections of the projectile.

In order that the pressure acting on the rear end of the projectile in the moment of firing shall not be reduced by escaping of the gases from the space behind the projectile through the passages 20 and 13 and past the flange 4, (which is less in diameter than the rear flange 5 and so does not fit initially closely to the bore of the barrel) to the space in front of the projectile, the passage 20 is closed at the rear by means of a valve plate 19 (similar to that described with reference to Figure 6) opening outwardly. This plate will remain in position as long as the propelling pressure on the rear end of the projectile is greater than the pressure of the trapped gases. When, on the other hand, the latter pressure becomes the greater, the valve plate is pressed off its seat, and the space between the flanges thereafter communicates directly with the space behind the projectile.

Figures 8 and 9 show respectively how the passages 13 may be arranged obliquely to the axis of the projectile and how a projectile having a rearwardly extending passage 20 need not necessarily have a valve 19 if the front flange 4 is not less in diameter than the rear flange because in the latter the gases will not be able to escape past the front flange to any appreciable extent because after the first moment of firing the front flange fits closely in the bore. Figure 9 also shows how the passages 13 may be more or less tangential to the passage 20, and these passages 13 in such a case would be designed to discharge the gases in the opposite rotational direction to that in which the projectile turns when fired.

Figures 10 and 11 show how, if desired, either in a projectile having front and rear flanges of equal diameters; means may be provided in the front flange for enabling gases collecting in the space 12 to escape, such means comprising two or more passages 21 formed in the front flange 4 so as to extend from the front face of the latter to the cannelure 6 at the rear of the flange. In addition, any of the other devices herein described, for reducing the gas pressure between the flanges for example the radial passages 13 and forwardly extending passages 14, may be employed in this construction of projectile in addition to the passages 21 in the front flange 4.

Figure 12 shows a modification of the projectile illustrated in Figures 10 and 11 in which, in this case, the front flange 4 is of the same diameter as the rear flange 5 instead of being of less diameter than the latter as in the construction illustrated in Figure 10 and the passages 13 and 22 are omitted.

Figures 13 and 14 show a modification of the projectile shown in Figure 1, in which the passages 13 communicate with a peripheral groove 24 provided at the base of the cannelure 6 behind the front flange. In this way, the pressure in all of the passages 13 is equalized by reason of these passages still being in communication with one another when the front flange 4 is depressed into its cannelure.

Figure 15 shows a projectile very similar to that illustrated in Figures 13 and 14 but in this case the annular groove 24 is provided in the cylindrical body part 16 of the projectile instead of at the base of the front cannelure 6.

With a projectile such as shown in Figure 15 the passages 13 are all in communication with one another (and the pressures in all these passages are therefore equalized) even when the flanges of the projectile have been depressed and when the cylindrical part 16 of the projectile lies in contact or substantially in contact with the bore of the barrel.

Figure 16:
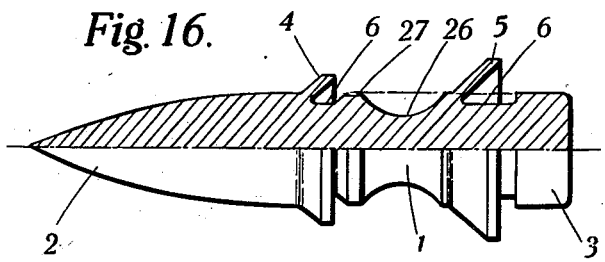

Another method of reducing or obviating the detrimental effects created by obtaining high gas pressure in the space between a pair of projectile flanges is shown in Figure 16 and comprises in providing a projectile (having the front flange 4 less in diameter than the rear flange 5 as in the projectile shown in Figure 1) with an annular cavity or recess 26 in the cylindrical part 16 thereof, which recess forms an annular enlargement of the space in which the trapped gases, (i. e. those which do not escape over the front flange and between the lands) are housed and in which they are not very considerably compressed. To facilitate the passage of the trapped gases behind the foremost flange 4 to the recess 26, the diameter of the projectile may, at 27, be rather less than the nominal calibre of the cylindrical part 16. It will be appreciated that were the groove or cavity 26 not provided and were no other means provided for the escape of gas from between the flanges, gases trapped between the flanges would attain a very high and dangerous pressure as the projectile passes down the barrel because the space in which they are housed would become extremely small and at the most would only be a radially very narrow annular space. On the other hand, where the groove or cavity 26 or its equivalent is provided these trapped gases are housed in a greater space than that just referred to even at the moment before the bullet leaves the barrel and therefore the trapped gases are at a considerably less pressure than would be the case if the groove or cavity were not provided and if no other means of escape were provided.

Figure 17:
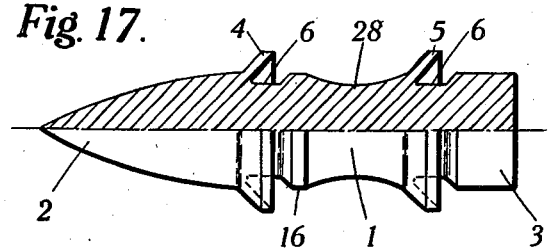

Figure 17 illustrates a projectile somewhat similar to that shown in Figure 16, but in this case the front and rear flanges 4 and 5 are of equal diameter and all the gases trapped between these flanges are retained, during the movement of the projectile through the barrel, between the flanges but the pressure of these trapped gases is kept sufficiently low as not to be harmful to the performance of the projectile. This is attained by providing the groove 28 circumferentially around the body 1 of the projectile between the front and rear flanges 4 and 5 and by making this groove 28 of dimensions suitable for the purpose above indicated for any given calibre. The groove 28 is preferably made shallow and wide and without corners, as shown in the drawings, so as to interfere to the minimum degree with the performance of the projectile after it leaves the barrel.

A projectile constructed in accordance with Figures 16 or 17 is simple and relatively inexpensive to manufacture and is very efficient in action.

Figure 18:
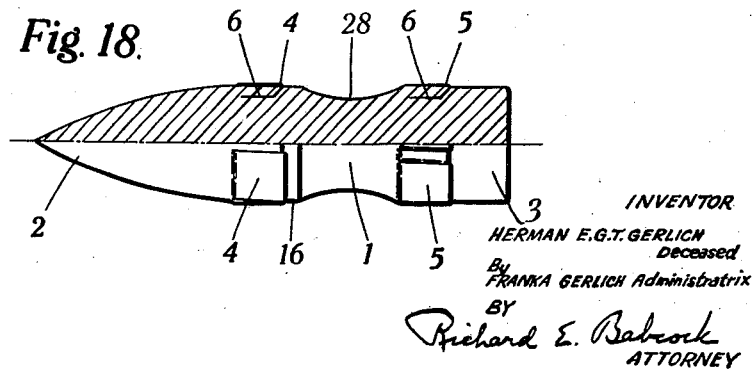
Figure 18 is a similar view to Figure 17 but shows the projectile of Figure 17 after firing.

Figure 18 shows the projectile illustrated in Figure 17 after it has been fired and from this figure it will be seen that the flanges 4, and 5 when folded down fill the cannelures 6, 6.

Figure 19:
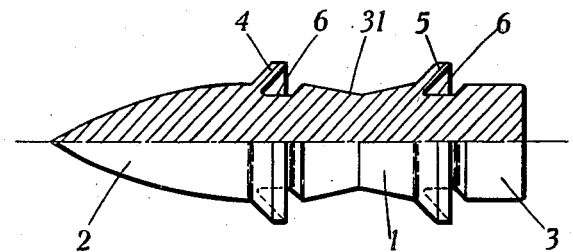

Figure 19 shows a projectile in all respects like that shown in Figure 17 with the exception that an annular groove 31 of shallow V-shaped cross section replaces the groove 28 of curved cross section shown in Figure 17.

Figure 20:
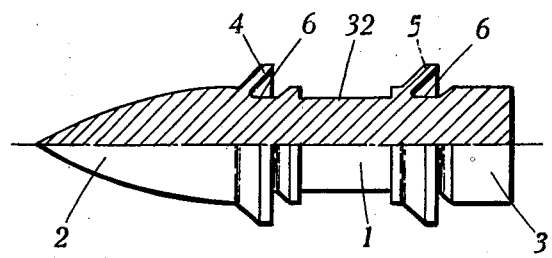

Figure 20 shows how the grooves 28 and 31 of Figures 17 and 19 respectively can be replaced by a groove 32 of shallow rectangular cross section.

Figure 21:
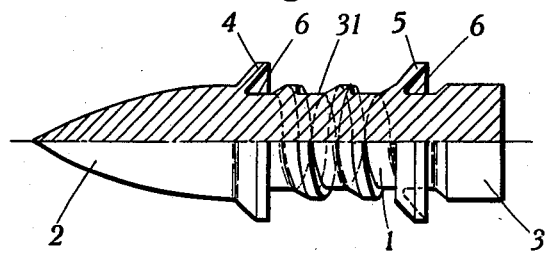

Figure 21 shows how the simple annular circumferential grooves 28, 31 and 32 can be replaced by a helical groove 35.

Figure 22:
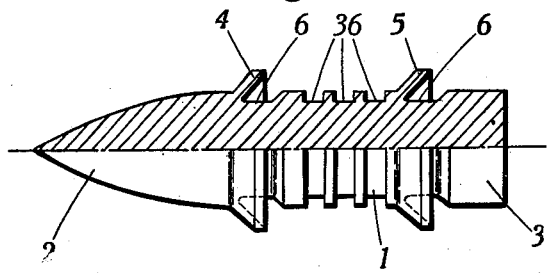

Figure 22 illustrates how grooves 28, 31, 32 and 35 can be replaced by a plurality of smaller spaced grooves 36. The grooves 36 shown in this figure by way of example are of rectangular cross section.

Obviously many other shapes and forms of groove or recess can be employed for effecting a reduction of the pressure of the trapped gases to the required extent.

In practice it is found that a projectile constructed in accordance with Figure 16 or Figure 17 gives excellent results and attains the object in view. The construction shown in Figure 19 attains the same result to almost the same degree and these three constructions are the ones preferred but very good results can be obtained with the other constructions illustrated in the drawings and particularly those with either passages in the front flange as shown for example in Figure 12 or rearwardly extending passages as shown for example in Figure 7 or 8. Although projectiles with passages extending forwardly through the body also produce the desired result they are not so desirable in practice as the other projectiles illustrated and referred to because of eddy currents that the open passage ends in the front of the projectile are liable to create.

It will be understood that where the forward flange or flanges is or are of smaller diameter than the rear flange or flanges, the forward flange or flanges gradually cut into the lands in a rifled barrel as the projectile moves forwardly through the barrel. The rate at which the forward flanges are cut into by the lands depends, of course, on the conicity or rate of taper of the barrel.

The rear flange of the projectile may in some cases be made stronger than the forward flange of the projectile, and this strengthening of the rear flange may be employed whether the forward flange is smaller than the rear flange or not.

In the cases of projectiles having one or more passages therethrough the shapes of the openings to the passages provided in the projectiles, especially the passages opening into the flank of the point of the projectile or into any part of the projectile in front of the foremost flange, may be given any desired or suitable cross sectional shape and may also be covered by graphite, wax, ceresine, etc., which will be driven out by the expelled gases.

The cross sectional area of the respective passages and the number of these passages and/or the volume or volumes of said annular or equivalent recess or groove or recesses or grooves should be regulated in relation to the volume and the pressure of the gases to be disposed of, as well as in accordance with the time-factor, i. e. the time within which the expulsion of the gases has to be effected, and also in accordance with the varying conditions, and the respective resistance which is offered under the varying conditions to this expulsion or blowing out of the gases. It will be appreciated that the resistance offered is different in the case of expulsion in a forward direction, to the resistance in the case of expulsion to the rear of the projectile.

It will be appreciated that this invention by providing for the escape of gases which otherwise would be trapped or for reducing the pressure of such gases, decreases the resistance of the projectile flanges to depression, eliminates or decreases the possibility of the flanges being partially or wholly blown up on the projectile leaving the firearm barrel, and generally materially contributes to an improved performance on the part of the projectiles.

What is claimed is:—

1. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and means adapted to reduce the pressure of gases collecting between the flanges of the projectile during the period that the latter is in the barrel.

2. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and said body being cavitied, additionally to said cannelures, in order to effect a reduction of the pressure of gases collected between the flanges of the projectile during the period that the latter is in the barrel.

3. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and the said body being recessed, additionally to and independently of said cannelures, at its periphery between the flanges.

4. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and said body also having in its surface, and between successive flanges, a recess extending around the body.

5. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and said body also having in its outer surface, and between successive flanges, an annular groove extending completely around the body.

6. A projectile for firearms comprising a body, a pair of axially spaced depressible peripheral flanges on said body, such flanges being of the same diameter as one another and each projecting outwardly and rearwardly from the body, a cannelure behind each of said flanges adapted to receive such parts of the latter as are pressed thereinto as the projectile passes through the barrel of the firearm, and the said body being recessed, independently of said cannelures, at its periphery between said flanges.

7. A projectile for firearms comprising a body, a pair of axially spaced depressible peripheral flanges on said body, such flanges being of the same diameter as one another and each projecting outwardly and rearwardly from the body, a cannelure behind each of said flanges adapted to receive such parts of the latter as are pressed thereinto as the projectile passes through the barrel of the firearm, and the body having between the flanges a groove extending around the body.

8. A projectile for firearms comprising a body, a pair of axially spaced depressible peripheral flanges on said body, such flanges being of the same diameter as one another and each projecting outwardly and rearwardly from the body, a cannelure behind each of said flanges adapted to receive such parts of the latter as are pressed thereinto as the projectile passes through the barrel of the firearm, and the body having between the flanges a continuous annular recess of curved cross section.

9. A projectile for firearms comprising a body, a pair of axially spaced depressible peripheral flanges on said body, such flanges being of the same diameter as one another and each projecting outwardly and rearwardly from the body, a cannelure behind each of said flanges adapted to receive such parts of the latter as are pressed thereinto as the projectile passes through the barrel of the firearm, the body having between the flanges a continuous annular recess which is wide in relation to its depth and is of curved cross section.

10. A projectile for firearms comprising a body, a pair of axially spaced peripheral outwardly and rearwardly extending flanges on said body, a cannelure behind each of said flanges adapted to receive such flanges when pressed down as the projectile passes through the barrel of the firearm, the forward flange of the pair being of smaller diameter than the other flange, and the said body being recessed, independently of said cannelures, at its periphery between said flanges.

11. A projectile for firearms comprising a body, a pair of axially spaced peripheral outwardly and rearwardly extending flanges on said body, the forward flange of the pair being of smaller diameter than the other flange, and the body having between the flanges a groove extending around the body.

12. A projectile for firearms comprising a body, a pair of axially spaced peripheral outwardly and rearwardly extending flanges on said body, the forward flange of the pair being of smaller diameter than the other flange, the body having between the flanges a continuous annular recess of curved cross section.

13. A projectile for firearms comprising a body, axially spaced depressible peripheral flanges on said body and projecting outwardly and rearwardly therefrom, a cannelure behind each of said flanges adapted to receive such parts of the latter as are pressed thereinto as the projectile passes through the barrel of the firearm, and said body having passage means therethrough, such passage means communicating with the exterior of the body at an end thereof and beyond said flanges and also communicating with the space or spaces between successive flanges.

14. A projectile for firearms comprising a body, axially spaced depressible peripheral flanges of equal diameter on said body and projecting outwardly and rearwardly therefrom, a cannelure behind each of said flanges adapted to receive such parts of the latter as are pressed thereinto as the projectile passes through the barrel of the firearm, and said body having passage means therethrough, such passage means communicating at one end with the exterior of the projectile at the rear of the rear flange thereof and at the other end communicating with the space or spaces between successive flanges.

15. A projectile for firearms and comprising a body having axially spaced circumferential flanges adapted to be depressed around the said body during its passage through the barrel of the firearm, said body also having behind each of said flanges a cannelure to receive the flange, and in addition having inwardly extending passages transverse to the axis of the projectile and communicating with the space between a pair of successive flanges and also communicating with longitudinal passage means provided in the said body, and said longitudinal passage means being adapted to discharge behind the rear flange of the projectile, and an openable valve adapted to close temporarily the rear end of said passage means.

16. A projectile for firearms comprising a body, axially spaced depressible peripheral flanges on said body and projecting outwardly and backwardly therefrom, a cannelure behind each of said flanges adapted to receive the adjacent flange as it is pressed down as the projectile passes through the barrel of the firearm, and the projectile having passage means formed through a part thereof and such passage means communicating with the space between a pair of said axially spaced flanges and also communicating with the space beyond these flanges.

FRANKA GERLICH,
*Administratrix of the Estate of Hermann E. G. T. Gerlich, Deceased.*